United States Patent
Long et al.

(10) Patent No.: US 11,858,041 B2
(45) Date of Patent: Jan. 2, 2024

(54) ELECTRICAL MEASUREMENT OF A GREEN OBJECT DURING SINTERING

(71) Applicant: Hewlett-Packard Development Company, L.P., Spring, TX (US)

(72) Inventors: Greg Long, Corvallis, OR (US); Andrew L. Van Brocklin, Corvallis, OR (US); David Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 370 days.

(21) Appl. No.: 15/734,604

(22) PCT Filed: Jan. 15, 2019

(86) PCT No.: PCT/US2019/013635
§ 371 (c)(1),
(2) Date: Dec. 3, 2020

(87) PCT Pub. No.: WO2020/149830
PCT Pub. Date: Jul. 23, 2020

(65) Prior Publication Data
US 2021/0362241 A1   Nov. 25, 2021

(51) Int. Cl.
*B22F 10/85* (2021.01)
*B22F 10/40* (2021.01)
*G01N 27/04* (2006.01)
*B22F 3/00* (2021.01)
*B33Y 40/20* (2020.01)

(52) U.S. Cl.
CPC .............. *B22F 10/85* (2021.01); *B22F 3/003* (2013.01); *B22F 10/40* (2021.01); *G01N 27/043* (2013.01); *B22F 2203/11* (2013.01); *B33Y 40/20* (2020.01)

(58) Field of Classification Search
CPC .. B22F 10/40; B22F 10/85; B22F 2003/1046; B22F 2203/00; B22F 2203/11; B22F 2999/00; B22F 3/003; B33Y 40/20; G01N 27/043; Y02P 10/25; H05B 7/06
USPC ........ 373/135, 145, 150, 155; 374/183, 184, 374/185, 208
See application file for complete search history.

(56) References Cited

U.S. PATENT DOCUMENTS

| | | | |
|---|---|---|---|
| 2,528,537 A | 11/1950 | Monnik et al. | |
| 4,293,730 A | 10/1981 | Myers | |
| 4,365,788 A | 12/1982 | Block | |
| 4,413,810 A | 11/1983 | Tenberg et al. | |
| 4,453,159 A | 6/1984 | Huff et al. | |
| 4,823,359 A * | 4/1989 | Ault | C03B 5/43 373/164 |

(Continued)

FOREIGN PATENT DOCUMENTS

| | | |
|---|---|---|
| EP | 2554955 A1 | 2/2013 |
| RU | 2595072 C2 | 8/2016 |
| WO | WO-WO1997039341 A1 | 10/1997 |

*Primary Examiner* — Quang T Van
(74) *Attorney, Agent, or Firm* — Shook, Hardy & Bacon L.L.P.

(57) ABSTRACT

In an example implementation, a sintering system includes a support structure in a sintering furnace to support a token green object during a sintering process. The system includes wires installed into the furnace and through the support structure to contact the object. An impedance meter is operatively coupled to the wires to determine electrical impedance of the object during the sintering process.

15 Claims, 6 Drawing Sheets

(56) References Cited

U.S. PATENT DOCUMENTS

| | | |
|---|---|---|
| 5,158,366 A | 10/1992 | Nagai et al. |
| 7,090,801 B2 | 8/2006 | Mueller et al. |
| 2016/0027934 A1* | 1/2016 | Noyes ............. H01L 31/022425 252/502 |
| 2017/0130287 A1 | 5/2017 | Takahashi et al. |
| 2018/0080892 A1 | 3/2018 | Kikuzumi et al. |

* cited by examiner

ELECTRICAL MEASUREMENT OF A GREEN OBJECT DURING SINTERING

BACKGROUND

Powder metal manufacturing processes such as MIM (metal injection molding) processes and binder jetting 3D printing processes produce metal objects from powdered metal materials. Such processes include preparing "green objects" that comprise powdered metal and a binder. The binder material can be removed from a green object during a binder burnout phase of a sintering process, and the powdered metal can then be consolidated and densified in the sintering process to improve the strength and integrity of the object. Sintering processes, such as pressurized sintering and atmospheric (pressureless) sintering, expose green objects to high temperatures for predetermined periods of time to bond the powdered metal particles together. During the sintering process, objects are brought up to an appropriate sintering temperature that is below the melting point of the metal powder, and the objects are maintained at the sintering temperature according to a predetermined time-temperature profile.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
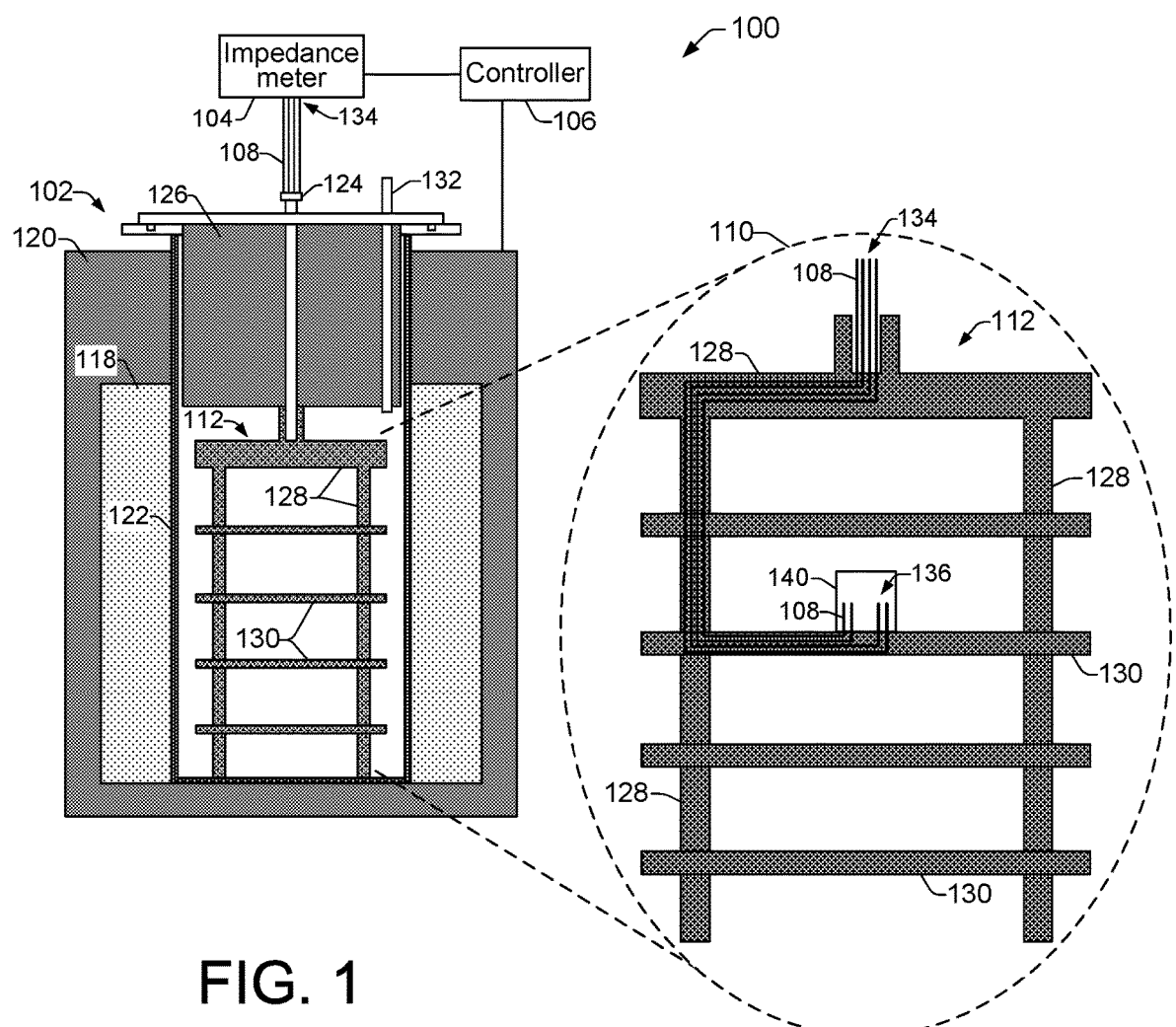
FIG. 1 shows a block diagram of an example sintering furnace system suitable for detecting the endpoint of a sintering process and providing accurate sintering cycle times based on electrical measurement of a green object.

Sintering is a heat treatment process often used to improve mechanical and other properties of "green" state objects or parts produced by different manufacturing methods such as binder jet 3D printing and MIM (metal injection molding) processes. A green object is an object whose material is in a weakly bound state, such as weakly bonded powder material before it has been sintered or fired. Sintering processes expose "green" objects to high temperatures for predetermined periods of time. Time-temperature profiles for sintering processes are generally determined based on experimentation with properties including the material type, material density, wall thickness, and total mass and general thermal load of the green objects to be sintered. Such profiles are designed to control the heating and cooling cycles of the sintering process so that the green objects within a furnace are exposed to the proper sintering temperature for the correct amount of time that will bring the objects to a sintering endpoint or completion. However, determining such time-temperature profiles can be costly due to, for example, variations in thermal properties of different materials, variations in total thermal mass between different sintering runs, variations in thermocouple calibration, and so on. In addition, the time-temperature profiles merely provide an indirect method for estimating when a sintering endpoint will be reached. Therefore, controlling sintering cycles based on predetermined time-temperature profiles can result in suboptimal quality among the sintered objects within a given sintering furnace load.

In some examples, a sintering furnace can be loaded with green objects and programmed with a particular time-temperature profile to control the heating and cooling cycle of the furnace. The time-temperature profile for a given furnace load is generally determined through trial and error based on the expected thermal load of the green objects to be sintered, which considers the mass of the load as well as the dimensional and material characteristics of the objects, as noted above. However, a furnace load can include green objects with varying characteristics, such as objects that have different thermal loads and/or different sizes, shapes, and thicknesses. In some 3D printing processes, such as binder jetting, for example, there can be a significant degree of variability among the green objects that are produced within different printing batches or within the same printing batch. Therefore, the profiles for controlling sintering cycle times are often developed to accommodate the worst-case scenario. Worst-case scenarios can be determined based on green objects that are expected to have the greatest thermal loads, the thickest object sections, and/or the types of metal powder materials that call for the longest furnace sintering times.

Because sintering cycle times are usually developed to accommodate green objects that represent such worst-case scenarios, other green objects within a same furnace load are often exposed to longer sintering times that can extend well beyond their sintering endpoints. Extended sintering times can result in over-sintering of some objects and can degrade the quality and performance of the sintered objects, as well as increase the costs associated with operating the sintering furnace, including additional time, energy, and furnace wear and tear.

As noted above, during the sintering process green objects are brought up to an appropriate sintering temperature for predetermined periods of time to achieve the sintering endpoint or completion. Sintering temperatures are generally some percentage of the melting point temperature of the metal material being sintered. For example, sintering temperatures can be on the order of 70%-90% of the melting point. Measuring and monitoring furnace temperatures to ensure that the correct sintering temperature is reached and sustained at the center of the furnace "hot zone" can be challenging and costly.

One method for monitoring temperature in a sintering furnace involves the use of thermocouples, which can add significant cost to the sintering process. Thermocouples are application specific devices because they have to be matched with the process gas and the temperatures being used for sintering the green object materials within a furnace load. In addition, thermocouples are typically located on the outside of the thermal mass cluster and are ideally routed to the center of the furnace hot zone to provide the most accurate temperature information. Furthermore, it should be noted that even when thermocouples can be used to provide accurate temperature monitoring and control over predetermined time periods, such accurate implementation of time-temperature profiles is not a definitive method for determining when a sintering endpoint has been reached. Rather, such accurate control provides at best, an indirect method for estimating when the sintering endpoint has been reached. As a result, sintering times are often extended to ensure that the worst-case objects in a furnace load reach a sintering endpoint which, as noted above, can cause over-sintering of some objects within the furnace load.

Accordingly, an example sintering system and methods described herein improve the accuracy of sintering cycle times by enabling electrical measurement of a green object during a sintering process. Wire conductors can be used to provide a voltage across a token green object being sintered in a furnace. electric current flow through a token green object being sintered in a furnace. The wires enable an electrical measurement (e.g., a total impedance measurement) of the green object during the sintering. The electrical measurement can provide information about the densification of the green object, for example, by comparing the measurement value with a target value that represents a degree of densification. The target value can be experimentally determined, for example, to correspond with a degree of densification that indicates the sintering is complete, or has reached an endpoint. When the electrical measurement value reaches the target value, the system can determine that sintering of the token green object and other green objects being sintered is complete. In some examples, the system can use the rate of change of a measured electrical value to determine when the sintering of green objects is complete. Based on determining that the sintering of green objects is complete, the system can control the sintering cycle, for example, by initiating a furnace cool down phase. A furnace cool down phase might include, for example, turning off furnace heating elements and passively allowing the furnace to cool down, or turning off the furnace heating elements and actively cooling the furnace with an active air flow or water flow system.

As a green object densifies during sintering, an electrical characteristic of the green object can change. For example, during sintering the impedance of a green object can decrease to a degree that is inversely proportional to about the same degree that the density increases. Thus, the densification of a green object can be observed indirectly by measuring its impedance which decreases as the green object densifies and shrinks geometrically. As used herein, impedance refers to total impedance. Total impedance measurements include both real (ohmic) and complex (imaginary) components, so an impedance measurement can therefore provide a measure of impedance, capacitance, and/or inductance. Many powder metal materials have a density of about 80% after a binder burnout. During sintering of a green object, an example density of 80% can increase, for example, to 98%. Such an increase in density can result in a reduction in impedance on the order of 18% (i.e., (1/0.98−1/0.80)/(1/0.80)=−18%). This is a significant change in impedance that is readily measurable.

In some examples, a token green object can be positioned on a support structure in a sintering furnace. Electrical conductors/wires leading into the furnace can include electrical contacts attached at their distal ends. The electrical contacts at the distal ends of the wires are held in the furnace at a fixed position by the support structure. The fixed position of the electrical contacts can be such that the contacts are flush with (i.e., level with) the surface of the support structure on which the token green object is to be positioned, or the contacts can be proud of (i.e., raised above) the surface of the support structure on which the token green object is to be positioned. Such fixed positioning of the electrical contacts enables a token green object being held on the support structure to remain in contact with the electrical contacts during sintering. Outside of the furnace, an impedance meter can be operably coupled to the proximal ends of the electrical wires. As used herein, an impedance meter can refer to any appropriate meter or analyzer capable of measuring impedance parameters such as capacitance, inductance and impedance. Therefore, an impedance meter may include devices such as an LCR meter, an impedance analyzer, a network analyzer, and so on. Such devices are generally capable of measuring phase-sensitive voltage-to-current ratio which provides fundamental impedance values such as absolute impedance and phase, along with the real and imaginary parts of the impedance. An impedance meter generally comprises an AC voltage source to apply an AC voltage across the token green object, and a current meter (ammeter) to measure the current induced through the object by the applied voltage. The impedance meter converts the applied voltage and the measured current into an impedance value of the measured object. In some examples, an instrument system operably coupled to the proximal ends of the electrical wires can comprise a separate voltage source and digital multimeter. In different examples, varying arrangements of electrical wires and contact electrodes can be used to contact a token green object and provide electrical measurements. For example, arrangements of two wires, three wires, and four wires can be used to provide electrical measurements with varying degrees of accuracy.

In a particular example, a sintering system includes a support structure in a sintering furnace to support a token green object during a sintering process. The system includes wires installed into the furnace and through the support structure to contact the object. An impedance meter is operatively coupled to the wires to determine impedance of the object during the sintering process. In some examples, a controller can compare the impedance of the object with a predetermined target impedance and determine a sintering endpoint when the impedance reaches the target impedance.

In another example, a method of sintering includes heating a sintering furnace to a sintering temperature during a sintering process. The method includes measuring electrical impedance across a token green object in the furnace during the sintering process, and determining a sintering endpoint when the impedance reaches a target impedance. The method further includes initiating a furnace cool down phase based on determining the sintering endpoint.

In another example, a sintering furnace includes a shelf insertable into the furnace to support green objects during a sintering process. The green objects include a token green object that is representative of the green objects. The sintering furnace includes wires operatively coupled to an impedance meter that is to apply an AC voltage across the token green object and measure impedance across the token green object. In the furnace, a support structure is disposed on the shelf to support the token green object and the wires so that electrodes at ends of the wires maintain contact with the token green object throughout the sintering process. The furnace can include a controller to compare the measured impedance with a target impedance and initiate a furnace cool down phase when the measured impedance reaches the target impedance.

Figure 2:
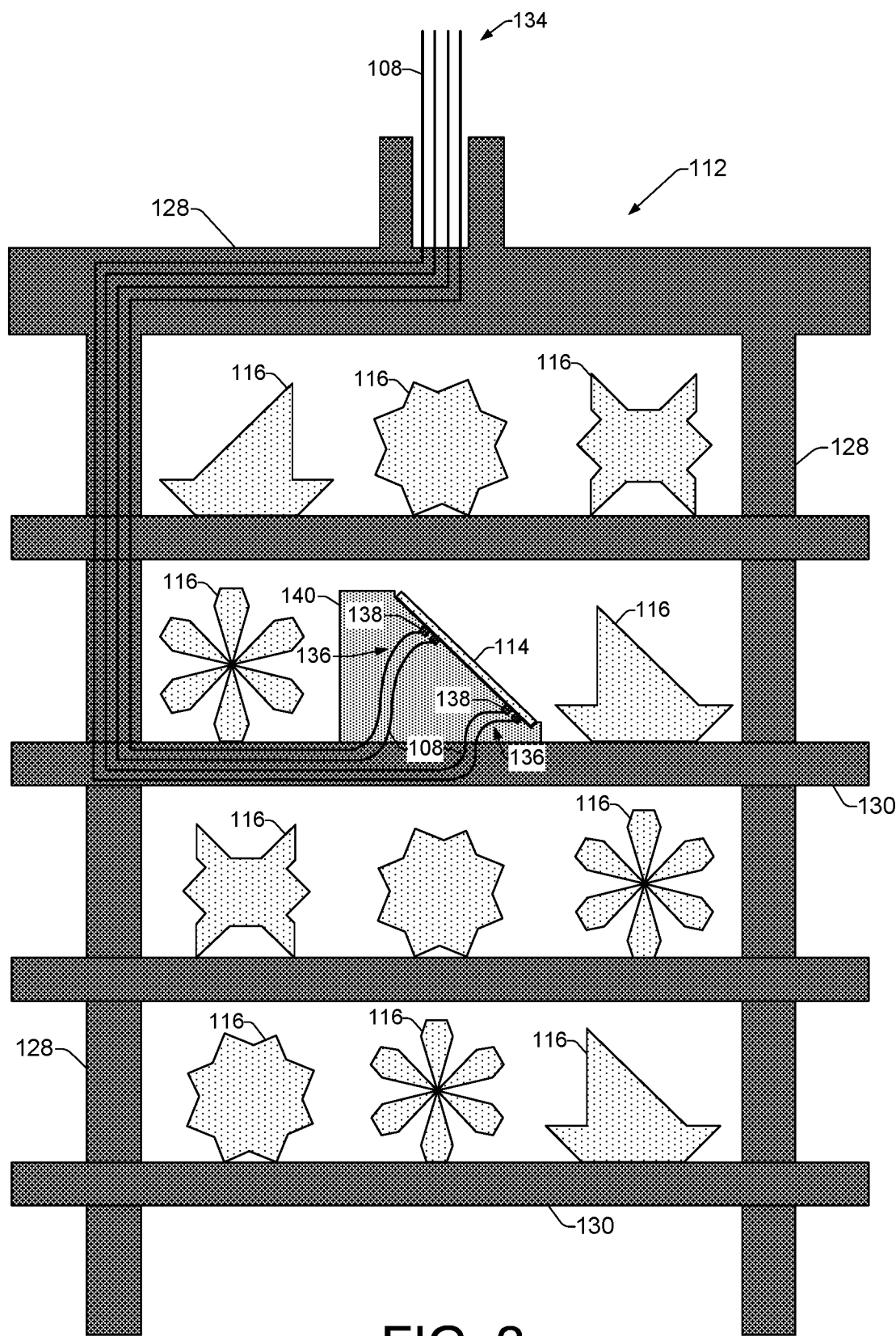
FIG. 2 shows an additional view of an example furnace rack that has been loaded with an example token green object and other example green objects for sintering.

FIG. 1 shows a block diagram of an example sintering furnace system 100 suitable for determining the endpoint of a sintering process and providing accurate sintering cycle times based on electrical measurements of a green object. The system 100 includes an example sintering furnace 102, an impedance meter 104, a controller 106, and electrical wires or conductors 108 operably coupled to the impedance meter 104. The electrical wires 108 can apply an AC voltage from the impedance meter 104 across a token green object 114 (FIG. 2) being sintered in the furnace 102, as well as take electrical measurements of the token green object during sintering. FIG. 1 includes an enlarged view 110 of an example furnace rack 112 that can support green objects inside the furnace 102 during a sintering process. FIG. 2 shows an additional view of the example furnace rack 112 that has been loaded with an example token green object 114 and other example green objects 116 for sintering.

An example controller 106 can include various components (not shown) to enable communication with, and control of, components of the example sintering system 100, such as the sintering furnace 102 and the impedance meter 104. Controller 106 can analyze and compare information and data received from the various components to make determinations and initiate system functions based on such analysis and comparison. Components of the controller 106 can include, for example, a processor (CPU), a memory, various discrete electronic components, and an ASIC (application specific integrated circuit). A memory can comprise non-transitory, machine-readable (e.g., computer/processor-readable) media that can store information in the form of machine-readable coded program instructions, data structures, program instruction modules, and other data and/or instructions executable by a processor. Stored information can include, for example, experimentally determined target value data to be used to analyze and compare electrical measurements and other information that can be sensed and received from the impedance meter 104, the sintering furnace 102, and other components of system 100.

Referring generally to FIGS. 1 and 2, the example sintering furnace 102 is sometimes referred to as a "hot wall" design where electric heating elements 118 or other heating sources are located inside the furnace 102 between a layer of insulation 120 and the furnace retort wall 122. The retort wall 122 can be made from different materials including a refractory metal, ceramic, quartz, or other materials capable of withstanding high temperatures. Peak sintering temperatures in the furnace can depend on the type of material being sintered, with an example range of such temperatures reaching as high as between 1100° C. to 1400° C. In an example sintering process, once the green objects 114, 116 (sometimes referred to as the "load" or "furnace load") are loaded into the furnace on the rack 112, the controller 106 can activate the heating elements 118 to begin heating the retort 122. The retort 122 can conduct or radiate the heat to the objects within the furnace.

In some examples, gas from a supply (not shown) can be introduced into the furnace atmosphere during a sintering process. For example, a flow of gas can be provided through a furnace inlet 124 formed in the door 126 or lid of the furnace 102. Gas lines (not shown) can be routed through the frame 128 of the furnace rack 112 to gas inlet ports (not shown) formed in the frame. The gas inlet ports can deliver gas into the furnace retort 122 to flow over green objects 114, 116, positioned on the shelves 130 of the furnace rack 112. In some examples, a sintering process can include a binder burnout phase where binder material (e.g., plastics) within the green objects is broken down by high temperatures, and the broken down components of the binder material are removed by the gas as it flows across the objects. The binder burnout phase can occur at lower temperatures during the earlier part of the sintering process. For example, the binder burnout phase can occur as the temperature within the furnace reaches approximately 400° C., which happens well before the furnace temperature increases up to sintering temperatures that exceed 1000° C. A variety of gases can be introduced into the furnace including, for example, hydrogen, nitrogen, and argon. Hydrogen gas is often introduced to serve as a reducing agent that helps keep the powder metal particles in the green objects 114, 116, from oxidizing, and removes other contaminants. The hydrogen reduction process helps the surfaces of the metal particles remain metallic which improves the strength of bonds that are created between particles during sintering.

In some examples, a fan (not shown) can be provided to circulate the atmosphere in the furnace 102. Generally, however, the pressure of gas flowing into the furnace retort 122 can push the atmosphere within the retort 122 out of the furnace, for example, through an outlet 132 located in the door 126 of the furnace 102. The atmosphere being pushed out of the furnace through the outlet 132 generally comprises gas, along with different elements being carried within the gas, such as the broken down components of the binder material, and the contaminants and water vapor that are generated by a hydrogen reduction process.

In the examples shown in FIGS. 1 and 2, the electrical wires 108 installed in the furnace 102 comprise four electrical wires 108. In other examples, the electrical wires 108 may comprise alternate arrangements of wires, such as three wires or two wires, as discussed in more detail herein below. The use of fewer wires 108 reduces the accuracy of electrical measurements taken of a token green object 114 during sintering, as discussed in more detail below. An electrical wire 108 comprises a material that is tolerant of the high temperature sintering environment, such as tungsten, platinum, Molybdenum, and stainless steel. While the electrical wires 108 are shown entering the furnace 102 through a furnace inlet 124 formed in the door 126 or lid of the furnace 102, and traveling generally through the frame 128 and a shelf 130 of the furnace rack 112, they can be installed in the furnace in other ways. For example, the electrical wires 108 may enter the furnace through a side wall of the furnace. The flexibility and thin profile of the electrical wires 108 permits installation into the furnace without the use of a window or gap in the furnace wall through which excessive heat would otherwise escape during the high temperature sintering process. The electrical wires 108 therefore enable the application of an AC voltage to a token green object inside the furnace as well as enabling electrical measurement to be taken inside the furnace, without hindering the heating function of the sintering furnace.

Referring to FIGS. 1 and 2, the proximal ends 134 of the electrical wires 108 remain outside of the furnace 102 and are operably coupled to the impedance meter 104. The distal ends 136 of the electrical wires 108 can include contact electrodes 138 that can be held in a stationary position within the furnace by a support structure 140. The support structure 140 can be affixed to a shelf 130 within the furnace at a location near the center of the retort 122 in the area of the furnace hot zone. The support structure 140 can be made of a material that does not soften at high temperatures (e.g., the sintering temperature), such as Zirconia or Alumina, for example.

Figure 3A:
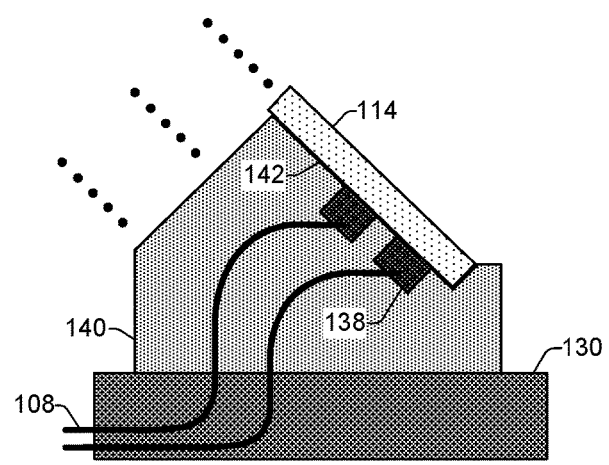
FIGS. 3A, 3B, and 3C, show enlarged views of a portion of an example support structure with a token green object positioned on a surface of the structure.
Figure 3B:
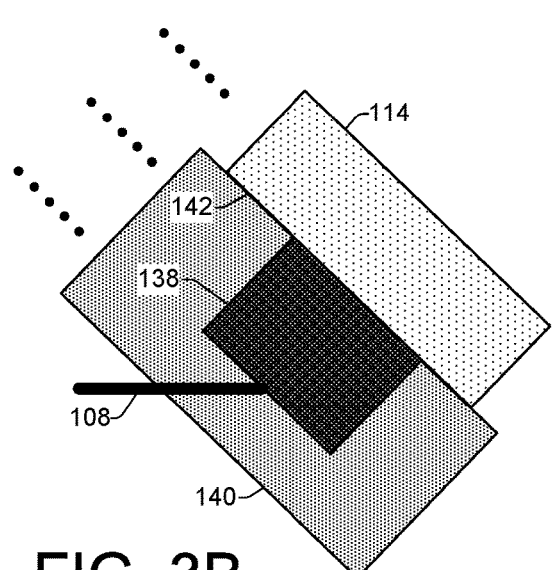
Figure 3C:
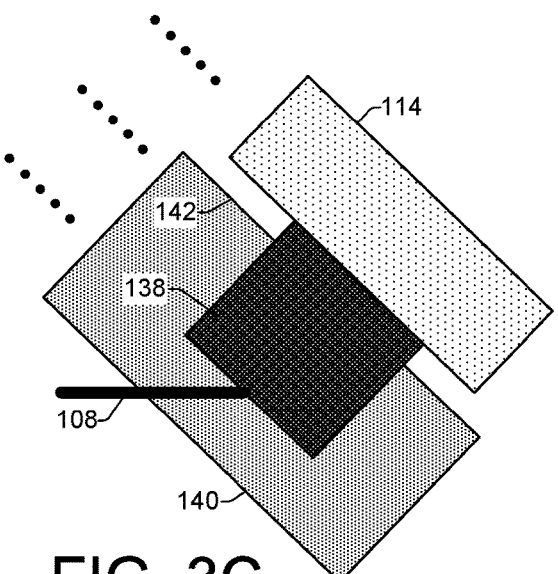

As shown in FIG. 2, the example support structure 140 can hold a token green object 114 in a position adjacent to the fixed contact electrodes 138 at the distal ends 140 of the electrical wires 108 such that the token green object 114 is in physical and electrical contact with the contact electrodes 138. This arrangement is better illustrated in FIGS. 3A, 3B, and 3C, which show enlarged views of a portion of the example support structure 140 with a token green object 118 resting on a surface 142 of the structure 140. As shown in FIGS. 3A and 3B, the contact electrodes 138 can be flush or level with the surface 142 of the support structure 140 to enable physical and electrical contact between the token green object 114 and the electrodes 138. In other examples, as shown in FIG. 3C, the contact electrodes 138 can be proud of, or elevated above the surface 142 of the support structure 140 which can help to improve physical and electrical contact between the electrodes 138 and the token green object 114.

The support structure 140 shown herein, for example at FIGS. 2, 3A, 3B, 3C, 4A, and 4B, is provided by way of an example and is not intended to indicate any limitation as to the size, shape, or other characteristics of such a structure. This is because features of the support structure 140, such as its size and shape, can depend in part on the size and shape of the token green object 114 that it will be supporting during a sintering process. Therefore, in other examples the support structure 140 can have different sizes and shapes in order to accommodate different token green objects 114 having different sizes and shapes.

Figure 4A:
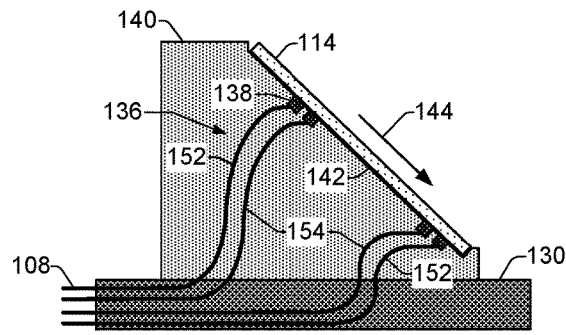
FIGS. 4A and 4B show enlarged partial views of an example support structure disposed on a furnace shelf and supporting a token green object both before and after undergoing densification in a sintering process.
Figure 4B:
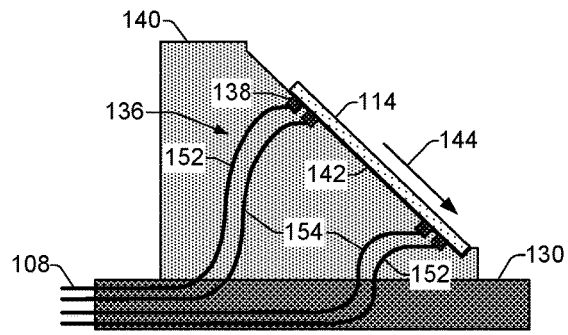

FIGS. 4A and 4B show enlarged partial views of an example support structure 140 disposed on a furnace shelf 130 and supporting a token green object 114 both before and after undergoing densification in a sintering process. In this example arrangement comprising four electrical wires 108, four corresponding electrodes 138 coupled at the distal ends 136 of the wires 108 provide physical and electrical contact with the token green object 114. In an example operation to take an electrical measurement of the token green object 114, the impedance meter 104 can apply a small AC voltage across the object 114 and then measure the current induced through the object 114. The impedance meter 104 can then divide the applied voltage by the measured current to determine the impedance of the token green object 114.

The example token green object 114 comprises a sacrificial object that can be produced in the same manufacturing process batch as the other green objects 116 being sintered within the same furnace load as the token object 114, as shown in FIG. 2. As noted above, FIG. 2 shows an example of a furnace rack 112 loaded with objects that include both a token green object 114 and a number of other green objects 116 that are to be sintered in a same sintering process. The token object 114 can be produced in a same manufacturing process as the other green objects 116, such as in the same 3D binder jetting process or the same MIM process. The token object 114 is therefore materially and mechanically representative of the other green objects 116. For example, both the token object 114 and the green objects 116 can comprise the same type of powder metal material having the same material density and particle sizes. In addition, both the token object 114 and the green objects 116 will have had the same binder material added during the manufacturing process, and both will have been exposed to the same processing steps during manufacturing. In a 3D binder jetting process, for example, both the token object 114 and the other green objects 116 will undergo the same procedures such as powder layering, binder jetting, and radiation exposure using the same powder metal materials, the same binder liquid, the same binder liquid droplet sizes, the same radiation intensity, and so on.

Because the token green object 114 and the other green objects 116 comprise the same type of powder material with the same density and particle sizes, they behave in the same or similar manner during the sintering process. That is, during sintering, the green objects 116 undergo the same material densification and dimensional contraction as the token object 114 which is being electrically monitored. While the token object 114 may not be the same shape or size as the other green objects 116, the token object 114 can be designed to match the average wall thickness of the green objects 116 to be sintered. Regardless, however, the sintering time of green objects does not change significantly based on the relative thickness or size of the objects. Rather, the main factors that determine sintering times are the density of the object, the material type, and the particle size distribution of the material. The object thickness and size are of less significance in affecting sintering times because the time constants for heat transfer are smaller than the time constants for sintering. Thus, the time to heat both a small and large object, or a thin and thick object, is mostly insignificant in comparison to the time it takes the objects to begin densification during the sintering process. Therefore, the sintering time for a smaller object such as a token object 114, is very close to the sintering time for a larger object such as the other green objects 116 shown in FIG. 2. Consequently, dimensional changes in the token object 114 that occur during sintering can be used to indicate corresponding changes in the other green objects 116 throughout the sintering process, including indicating the point when the sintering process reaches an endpoint.

Referring again generally to FIG. 4A, when a token green object 114 is first loaded onto the support structure 140 (FIG. 4A), its shape and size are in a non-densified state. The geometry of the object 114 can remain in this state during part of a sintering process, such as during the burnout phase, but the object begins to densify and shrink at some point after the furnace 102 reaches the sintering temperature. During a binder burnout phase, for example, when the furnace can reach temperatures on the order of 400° C., the size and shape of the object 114 will remain generally unchanged, because the object 114 will not yet be densifying.

As shown in FIG. 4B, the token green object 114 has undergone a sintering process and has densified (i.e. shrunk), causing one end of the object 114 to move down the surface 142 of the support structure 140, as indicated by the direction arrow 144 shown in FIGS. 4A and 4B. As the object 114 densifies, however, it remains in physical and electrical contact with the contact electrodes 138 being held in place by the support structure 140. As noted above, an increasing density in the object 114 has the general effect of reducing the impedance in the object 114. The decrease in impedance is generally due to an increase in the number-density of free electrons that corresponds with the increase in density. Thus, as the object 114 shrinks during sintering, its impedance decreases. The impedance of the token green object 114 can be measured in a number of ways, using different arrangements of electrical wires for applying AC voltage across the object 114 and taking electrical measurements, as noted above.

Figure 5:
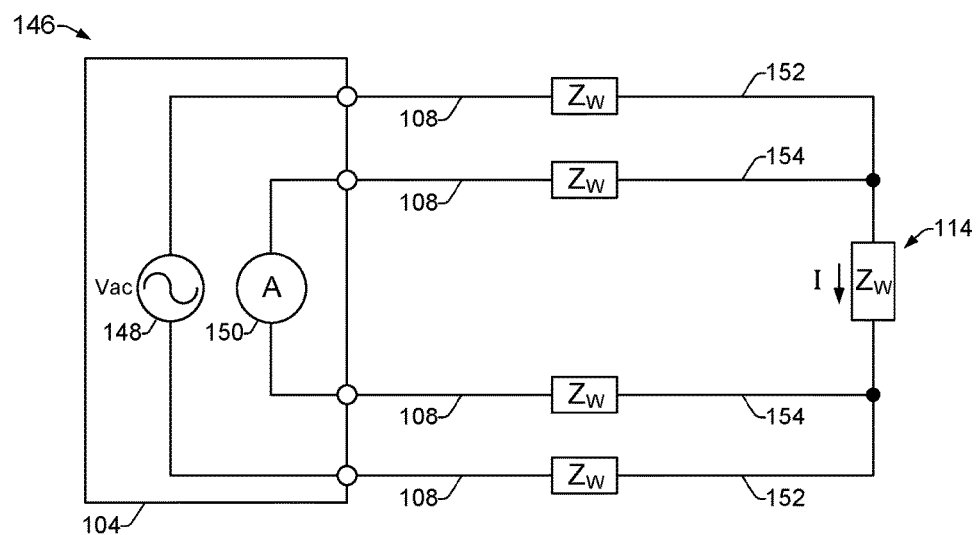
FIG. 5 shows an example of a 4-wire impedance measurement circuit suitable for measuring the impedance of a token green object during a sintering process.

FIG. 5 shows an example of a 4-wire impedance measurement circuit 146 suitable for measuring the impedance ($Z_T$) of a token green object 114 during a sintering process. The 4-wire circuit of FIG. 5 corresponds with the 4-wire arrangement of system 100 discussed above and shown in FIGS. 1, 2, 4A, and 4B. Impedance measurement circuits generally include an impedance meter 104, and they can be arranged as 2-wire measurement circuits, 3-wire measurement circuits, or 4-wire measurement circuits, such as the 4-wire circuit 146 shown in FIG. 5. The accuracy of impedance measurement circuits decreases as the number of wires used decreases. Thus, the 4-wire circuit is more accurate than both the 3-wire circuit and 2-wire circuit, and the 3-wire circuit is more accurate that the 2-wire circuit. The impedance meter 104 in such circuits generally operates by providing a small, known AC voltage from a voltage source 148, to be applied across an impedance (Z) being measured. The impedance meter 104 then measures the current (I) through the impedance Z with a current meter 150 within the impedance meter. The impedance meter then calculates the value of the impedance Z using the applied voltage and the measured current.

Referring primarily to FIG. 5, but also to FIGS. 4A and 4B, the example 4-wire impedance measurement circuit 146 includes an impedance meter 104 and an outer or first set 152 of two wires to apply an AC voltage from the voltage source 148 within the impedance meter across the impedance $Z_T$ being measured (i.e., the impedance of the token green object 114). The 4-wire measurement circuit 146 also includes an inner or second set 154 of two wires as sensing wires to sense the current (I) through the impedance $Z_T$ of the token green object 114 that can be measured by a current meter 150 within the impedance meter. The impedance meter 104 can then calculate the value of $Z_T$ using the applied voltage and measured current.

In different examples, the controller 106 (FIG. 1) can analyze information from the impedance meter 104 during a sintering process to determine when the token green object 114 and other green objects 116 have reached a sintering endpoint. In one example, the controller 106 can obtain the value of impedance $Z_T$ measured by the impedance meter 104 during sintering, and compare it with a predetermined target impedance value that is experimentally known to correspond with the point at which the token green object 114 will have reached the sintering endpoint. As noted above, the electrical impedance of a green object decreases to a degree that is inversely proportional to about the same degree that the density increases. Thus, as the token green object 114 densifies and shrinks during sintering from a non-densified state as in FIG. 4A to a densified state as in FIG. 4B, for example, the decreasing impedance $Z_T$ measured across the object can be used to indirectly observe the degree of densification that has occurred. When the impedance $Z_T$ reaches the predetermined target impedance value, the controller 106 can determine that the token green object 114 and other green objects 116 have reached the sintering endpoint. The controller 106 can then control the sintering cycle, for example, by initiating a furnace cool down phase.

In some examples, the controller 106 can analyze information from the impedance meter 104 during a sintering process to determine a measured rate of change of the impedance $Z_T$ measured across the token green object 114. The controller 106 can compare the rate of change of the measured impedance $Z_T$ with a predetermined target rate of change of impedance that is experimentally known to correspond with the point at which the token green object 114 will have reached the sintering endpoint. When the rate of change of the measured impedance $Z_T$ reaches the target rate of change of impedance, the controller 106 can determine that the token green object 114 and other green objects 116 have reached the sintering endpoint, and can initiate a furnace cool down phase.

In some examples, different electrical parameters of a token green object 114 can be measured during sintering and compared to target electrical parameter values to determine when the token green object 114 and other green objects 116 have reached a sintering endpoint. Examples of such electrical parameters can include resistance, imaginary impedance, capacitance, inductance, conductance, admittance, and conductivity.

Figure 6A:
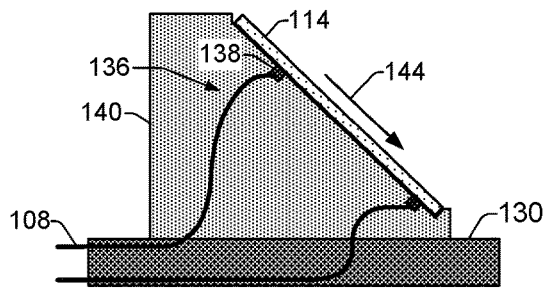
FIGS. 6A and 6B show enlarged partial views of an example support structure disposed on a furnace shelf and supporting a token green object both before and after undergoing densification in a sintering process.
Figure 6B:
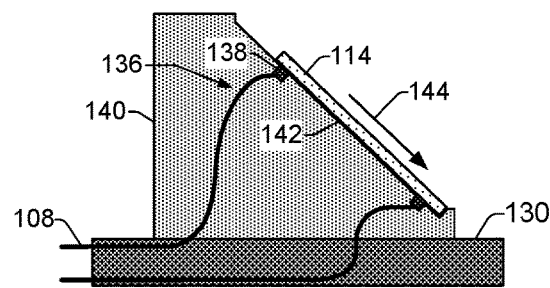
Figure 6C:
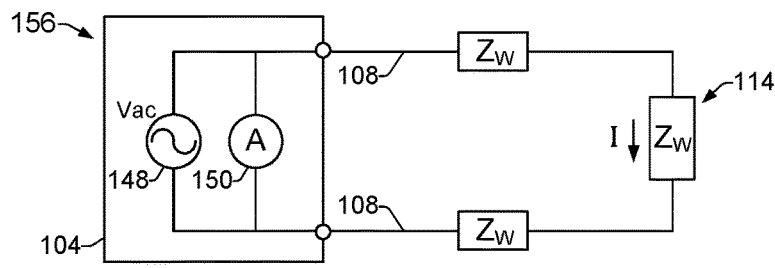
FIG. 6C shows an example of a 2-wire impedance measurement circuit suitable for implementing with the example support structure of FIGS. 6A and 6B, and for measuring the impedance of a token green object during a sintering process.

FIGS. 6A and 6B show enlarged partial views of an example support structure 140 disposed on a furnace shelf 130 and supporting a token green object 114 both before and after undergoing densification in a sintering process. The support structure 140 shown in FIGS. 6A and 6B is arranged to facilitate wires 108 and electrodes 136 of a 2-wire impedance measurement circuit for measuring the impedance ($Z_T$) of a token green object 114 during a sintering process. FIG. 6C shows an example of a 2-wire impedance measurement circuit 156 that may be implemented with a support structure 140 as in FIGS. 6A and 6B, and that is suitable for measuring the impedance ($Z_T$) of a token green object 114 during a sintering process.

In a similar manner as discussed above with regard to FIGS. 4A and 4B, when a token green object 114 is first loaded onto the support structure 140 as in FIG. 6A, its shape and size are in a non-densified state. The geometry of the object 114 can remain in this state during part of a sintering process, such as during the burnout phase, but the object begins to densify and shrink at some point after the furnace 102 reaches the sintering temperature. As shown in FIG. 6B, the token green object 114 has undergone a sintering process and has densified (i.e. shrunk), causing one end of the object 114 to move down the surface 142 of the support structure 140, as indicated by the direction arrow 144. As the object 114 densifies, it remains in physical and electrical contact with the two contact electrodes 138 being held in place by the support structure 140. As the object 114 densifies, its decreasing electrical impedance $Z_T$ can be measured by the example 2-wire impedance measurement circuit 156 of FIG. 6C.

The example 2-wire impedance measurement circuit 156 of FIG. 6C includes an impedance meter 104 and two wires 108 to deliver a small AC voltage from an AC voltage source 148 in the impedance meter across the impedance $Z_T$ being measured (i.e., the impedance of the token green object 114). In the 2-wire measurement circuit 156, the same two wires 108 that apply the AC voltage also act as sensing wires to sense the current (I) through the impedance $Z_T$ of the token green object 114 that can be measured by a current meter 150 within the impedance meter. During a sintering process, the impedance meter 104 can be controlled to provide the AC voltage, measure the current (I) through the object 114, and calculate the value of $Z_T$.

Figure 7A:
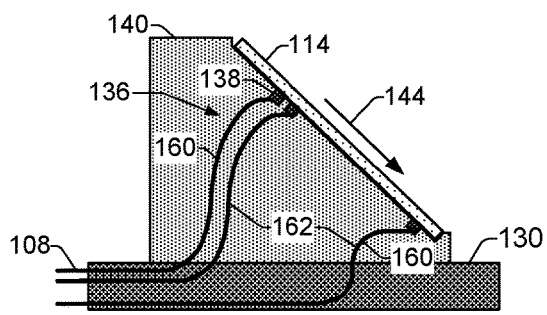
FIGS. 7A and 7B show enlarged partial views of an example support structure disposed on a furnace shelf and supporting a token green object both before and after undergoing densification in a sintering process.
Figure 7B:
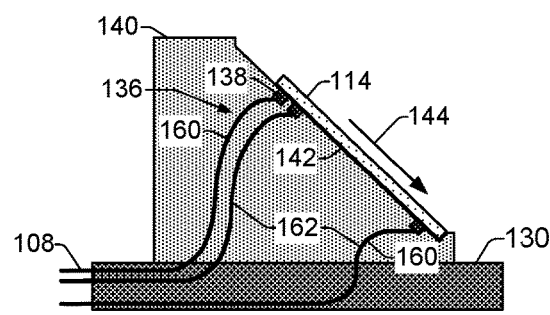
Figure 7C:
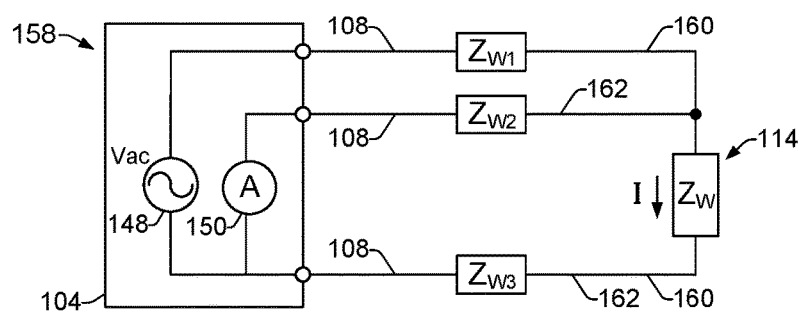
FIG. 7C shows an example of a 3-wire impedance measurement circuit suitable for implementing with the example support structure of FIGS. 7A and 7B, and for measuring the impedance of a token green object during a sintering process; and, FIGS. 8 and 9 are flow diagrams showing example methods of sintering.

FIGS. 7A and 7B show enlarged partial views of an example support structure 140 disposed on a furnace shelf 130 and supporting a token green object 114 both before and after undergoing densification in a sintering process. The support structure 140 shown in FIGS. 7A and 7B is arranged to facilitate wires 108 and electrodes 136 of a 3-wire impedance measurement circuit for measuring the impedance ($Z_T$) of a token green object 114 during a sintering process. FIG. 7C shows an example of a 3-wire impedance measurement circuit 158 that may be implemented with a support structure 140 as in FIGS. 7A and 7B, and that is suitable for measuring the impedance ($Z_T$) of a token green object 114 during a sintering process.

In a similar manner as discussed above with regard to FIGS. 4A and 4B, when a token green object 114 is first loaded onto the support structure 140 as in FIG. 7A, its shape and size are in a non-densified state. The geometry of the object 114 can remain in this state during part of a sintering process, such as during the burnout phase, but the object begins to densify and shrink at some point after the furnace 102 reaches the sintering temperature. As shown in FIG. 7B, the token green object 114 has undergone a sintering process and has densified (i.e. shrunk), causing one end of the object 114 to move down the surface 142 of the support structure 140, as indicated by the direction arrow 144. As the object 114 densifies, it remains in physical and electrical contact with the three contact electrodes 138 being held in place by the support structure 140. As the object 114 densifies, its decreasing electrical impedance $Z_T$ can be measured by the example 3-wire impedance measurement circuit 158 of FIG. 7C.

The example 3-wire impedance measurement circuit 158 of FIG. 7C includes an impedance meter 104 and a set of two wires 160 to provide an AC voltage from a voltage source 148 in the impedance meter across the impedance $Z_T$ being measured (i.e., the impedance of the token green object 114). In the 3-wire measurement circuit 158, a different set of two wires 162 act as sensing wires to sense the current (I) through the impedance $Z_T$ of the token green object 114 that can be measured by a current meter 150 within the impedance meter. As shown in FIG. 7C, one of the wires 108 of circuit 158 is shared between both the sets of wires 160 and 162. During a sintering process, the impedance meter 104 can be controlled to provide the AC voltage, measure the current (I) the object 114, and calculate the value of $Z_T$.

As discussed above with regard to the example 4-wire impedance measurement circuit 146 of FIG. 5, in different examples, the controller 106 (FIG. 1) can analyze information from the impedance meter 104 of a 2-wire circuit 156 (FIG. 6C) and a 3 wire circuit 158 (FIG. 7C) during a sintering process to determine when the token green object 114 and other green objects 116 have reached a sintering endpoint. Thus, the controller 106 can obtain the value of impedance $Z_T$ measured by the impedance meter 104 during sintering, and compare it with a predetermined target impedance value that is experimentally known to correspond with the point at which the token green object 114 will have reached the sintering endpoint. When the impedance $Z_T$ reaches the predetermined target impedance value, the controller 106 can determine that the token green object 114 and other green objects 116 have reached the sintering endpoint. The controller 106 can then control the sintering cycle, for example, by initiating a furnace cool down phase.

In other examples, the controller 106 can analyze information from the impedance meter 104 of a 2-wire circuit 156 (FIG. 6C) and a 3 wire circuit 158 (FIG. 7C) during a sintering process to determine a measured rate of change of the impedance $Z_T$ measured across the token green object 114. The controller 106 can compare the rate of change of the measured impedance $Z_T$ with a predetermined target rate of change of impedance that is experimentally known to correspond with the point at which the token green object 114 will have reached the sintering endpoint. When the rate of change of the measured impedance $Z_T$ reaches the target rate of change of impedance, the controller 106 can determine that the token green object 114 and other green objects 116 have reached the sintering endpoint, and can initiate a furnace cool down phase.

Referring now to FIGS. 5, 6C, and 7C, each impedance $Z_W$ shown in respective circuits 146, 156, and 158, represents the inherent impedance in the associated wires 108 and electrodes 138 coupled at the distal ends 136 of the wires 108, as well as other couplings (not shown). The impedance $Z_W$ is shown in FIGS. 5, 6C, and 7C, to help illustrate how the 4-wire impedance measurement circuit 146 provides a more accurate measure of the impedance $Z_T$ than the 2-wire and 3-wire impedance measurement circuits.

In general, when measuring for the impedance $Z_T$ in each of the example circuits 146, 156, 158, the impedance meter 104 measures the total impedance along the path of a wire 108. This measurement includes a series combination of $Z_W$ plus $Z_T$ plus $Z_W$. Thus, the value of such a measurement for $Z_T$ can be too high. Depending on the wires 108, electrodes 138, and other connections, the inherent impedance $Z_W$ can cause a significant error in the measurement of $Z_T$. In the example 2-wire circuit 156 of FIG. 6C, the error caused by the inherent impedance $Z_W$ is not avoidable.

In the example 4-wire circuit 146 of FIG. 5, when measuring for the impedance $Z_T$, error caused by the inherent impedance $Z_W$ can be mostly avoided. In the 4-wire circuit 146 of FIG. 5, there are separate sets of dedicated wires 152 and 154. The set of wires 152 is for applying AC voltage across the impedance $Z_T$ to be measured, and the set of wires 154 is for measuring the current (I) through the impedance $Z_T$. In the 4-wire circuit 146, it does not matter if there is inherent impedance $Z_W$ in the wires 108 and electrodes 136, because the voltage source 148 provides the same voltage that does not vary as current passes through any of the impedances $Z_W$ or $Z_T$. Because there is a separate set 154 of wires 108 to measure the current (I) through the impedance $Z_T$, the impedance in this set 154 of wires 108 does not affect the current measurement.

In the example 3-wire circuit 158 of FIG. 7C, when measuring for the impedance $Z_T$, some of the error caused by the inherent impedance $Z_W$ can be avoided. In the 3-wire circuit 158 of FIG. 7C, there are separate sets of wires 160 and 162, but each set shares the lower wire 108 with impedance $Z_{W3}$ as shown in the circuit 158. Using internal switching, the impedance meter 104 can measure the impedance in the upper part of the circuit that includes $Z_{W1}$ and $Z_{W2}$, as well as the impedance in the lower part of the circuit that includes $Z_{W2}$ and $Z_{W3}$. The impedance meter can divide the upper measurement by two to get an average of the impedances $Z_{W1}$ and $Z_{W2}$, and then use that average as the impedance for $Z_{W3}$ when it measures the lower part of the circuit 158. The 3-wire circuit 158 can be accurate if the impedances $Z_{W1}$, $Z_{W2}$, and $Z_{W3}$, are equal or very close in value.

Figure 8:
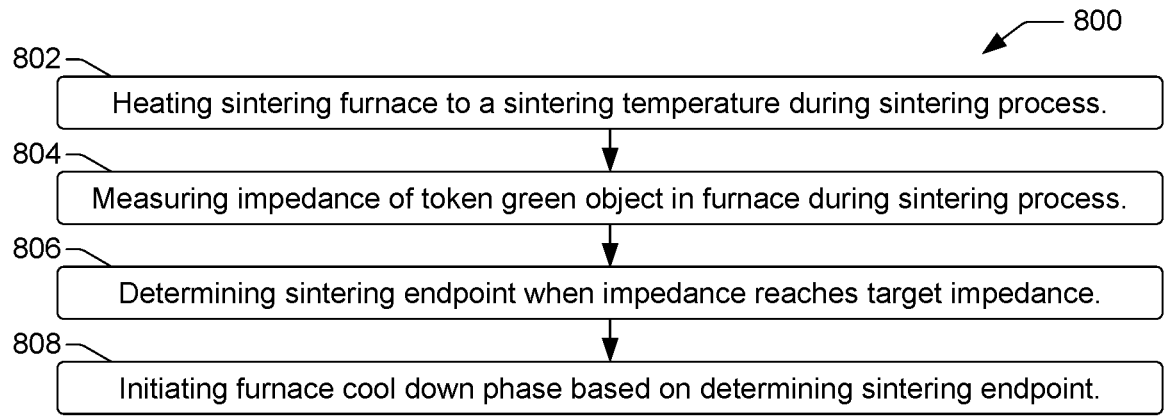
Figure 9:
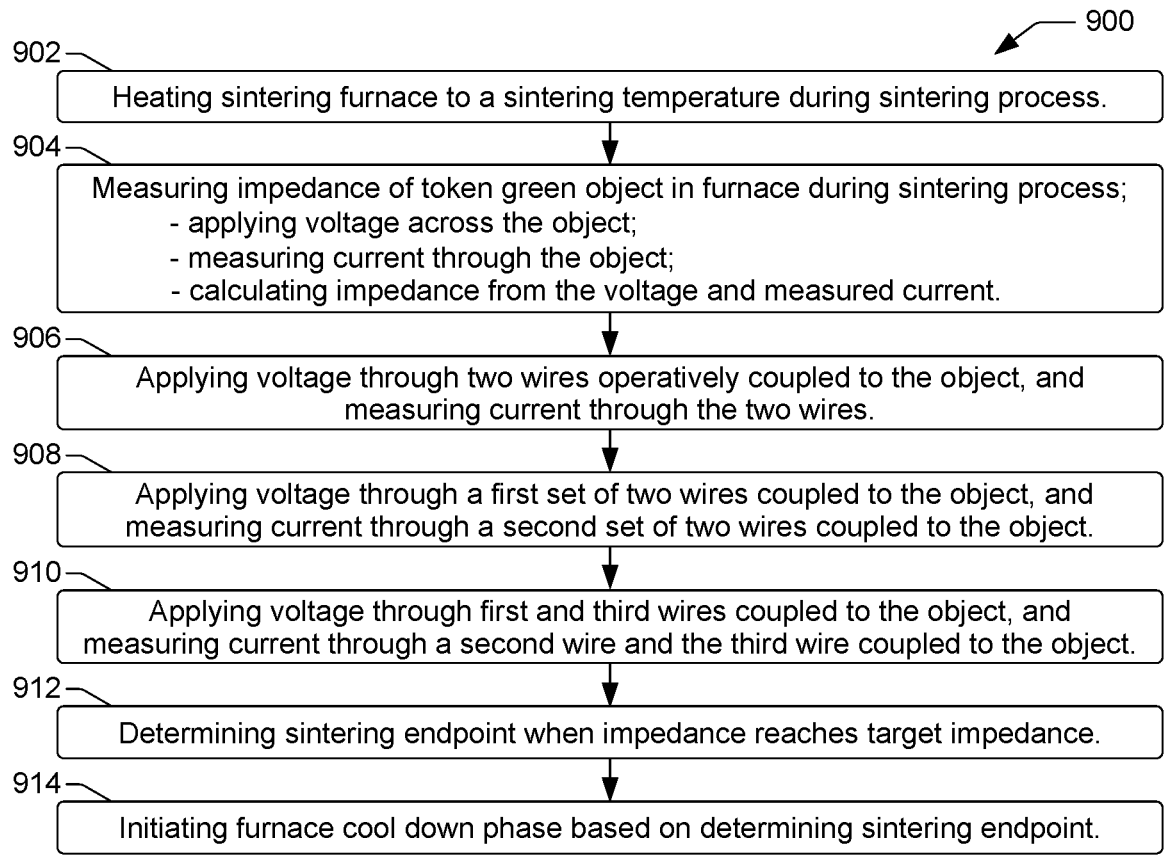

FIGS. 8 and 9 are flow diagrams showing example methods, 800 and 900, of sintering. Method 900 comprises an extension of method 800 and thereby incorporates additional details of method 800. The methods are associated with examples discussed above with regard to FIGS. 1-7, and details of the operations shown in the methods can be found in the related discussion of such examples. The operations of the methods may be embodied as programming instructions stored on a memory of a controller 106 and executable on controller 106.

Referring now to the flow diagram of FIG. 8, an example method of sintering, 800, begins at block 802 with heating a sintering furnace to a sintering temperature during a sintering process. The method includes measuring electrical impedance across a token green object in the furnace during the sintering process (804), and determining a sintering endpoint when the impedance reaches a target impedance (806). The method can further include initiating a furnace cool down phase based on determining the sintering endpoint (808).

Referring to the flow diagram of FIG. 9, another example method of sintering, 900, begins at block 902 with heating a sintering furnace to a sintering temperature during a sintering process. The method includes measuring electrical impedance across a token green object in the furnace during the sintering process (904). In some examples, measuring electrical impedance can include applying an AC voltage across the token green object, measuring current through the object, and calculating the impedance from the applied voltage and the measured current. In some examples, applying voltage and measuring current can include, respectively, applying voltage through two wires operatively coupled to the object, and measuring current through the two wires (906). In other examples, applying voltage and measuring current can include, respectively, applying voltage through a first set of two wires operatively coupled to the object, and measuring current through a second set of two wires operatively coupled to the object (908). In other examples, applying voltage and measuring current can include, respectively, applying voltage through first and third wires operatively coupled to the object, and measuring current through a second wire and the third wire operatively coupled to the object (910). The method further includes determining a sintering endpoint when the measured impedance reaches a target impedance (912), and initiating a furnace cool down phase based on determining the sintering endpoint (914).

What is claimed is:

1. A sintering system comprising:
   a support structure in a sintering furnace to support a token green object during a sintering process;
   wires installed into the furnace and through the support structure to contact the object; and,
   an impedance meter operatively coupled to the wires to determine electrical impedance of the object during the sintering process.

2. A system as in claim 1, wherein the impedance meter comprises:
   a voltage source operatively coupled to the wires to provide voltage across the object; and,
   a current meter operatively coupled to the wires to measure current through the object resulting from the voltage across the object;
   wherein the impedance meter determines the impedance of the object from the voltage and the measured current.

3. A system as in claim 2, wherein the wires comprise two wires such that the voltage source and the current meter are coupled to the same two wires.

4. A system as in claim 2, wherein the wires comprise four wires comprising a first set of two wires and a second set of two wires, and wherein the voltage source is coupled to the first set of two wires and the current meter is coupled to the second set of two wires.

5. A system as in claim 1, wherein each wire comprises a contact electrode elevated above a surface of the support structure on which the token green object is supported to maintain contact with the token green object.

6. A system as in claim 1, wherein each wire comprises a contact electrode that is flush with a surface of the support structure on which the token green object is supported to maintain contact with the token green object.

7. A system as in claim 1, further comprising:
   a controller to compare the impedance from the impedance meter with a predetermined target impedance, and to initiate a furnace cool down phase when the impedance reaches the target impedance.

8. A method of sintering comprising:
   during a sintering process, heating a sintering furnace to a sintering temperature;
   measuring electrical impedance across a token green object in the furnace during the sintering process;
   determining a sintering endpoint when the impedance reaches a target impedance; and,
   initiating a furnace cool down phase based on determining the sintering endpoint.

9. A method as in claim 8, wherein measuring impedance comprises:
   applying AC voltage across the token green object;
   measuring current through the object; and,
   calculating the impedance from the applied voltage and the measured current.

10. A method as in claim 9, wherein:
    applying AC voltage comprises applying AC voltage through two wires operatively coupled to the object; and,
    measuring current comprises measuring current through the two wires.

11. A method as in claim 9, wherein:
    applying AC voltage comprises applying AC voltage through a first set of two wires operatively coupled to the object; and,
    measuring current comprises measuring current through a second set of two wires operatively coupled to the object.

12. A method as in claim 9, wherein:
    applying AC voltage comprises applying AC voltage through first and third wires operatively coupled to the object; and,
    measuring current comprises measuring current through a second wire and the third wire operatively coupled to the object.

13. A sintering furnace comprising:
    a shelf insertable into the furnace to support green objects during a sintering process, the objects to include a token green object;
    wires operatively coupled to an impedance meter to deliver electric current through the token green object and measure impedance across the token green object;
    a support structure on the shelf to support the token green object and the wires so that electrodes at ends of the wires maintain contact with the token green object throughout the sintering process; and,
    a controller to compare the measured impedance with a target impedance and to initiate a furnace cool down phase when the measured impedance reaches the target impedance.

14. A sintering furnace as in claim 13, wherein the wires comprise a set of wires selected from a set of two wires, a set of three wires, and a set of four wires.

15. A sintering furnace as in claim 13 wherein the wires comprise high temperature resistant materials selected from Tungsten, Platinum, Molybdenum, Titanium, Carbone, Steel, and Palladium.

* * * * *